United States Patent [19]
Andersson et al.

[11] Patent Number: 5,837,071
[45] Date of Patent: Nov. 17, 1998

[54] DIAMOND COATED CUTTING TOOL INSERT AND METHOD OF MAKING SAME

[75] Inventors: Jan Magnus Andersson, Bristol, Va.; Nathan Anderson, Pleasant Grove, Utah

[73] Assignees: Sandvik AB, Sandviken, Sweden; Megadiamond, Provo, Utah

[21] Appl. No.: 593,465

[22] Filed: Jan. 29, 1996

Related U.S. Application Data

[63] Continuation-in-part of Ser. No. 145,233, Nov. 3, 1993, abandoned.

[51] Int. Cl.$^6$ ............................................. C21D 9/22
[52] U.S. Cl. ...................... 148/528; 148/529; 228/178; 228/262.2
[58] Field of Search ................... 148/527, 528, 148/529; 228/122.1, 178, 200, 262.2; 175/435

[56] References Cited

U.S. PATENT DOCUMENTS

| | | |
|---|---|---|
| 2,941,248 | 6/1960 | Hall . |
| 3,141,746 | 7/1964 | De Lai . |
| 3,444,613 | 5/1969 | Foerster ...................... 228/122.1 |

(List continued on next page.)

FOREIGN PATENT DOCUMENTS

| | | |
|---|---|---|
| 122 893 A1 | 10/1984 | European Pat. Off. . |
| 272 418 A2 | 6/1988 | European Pat. Off. . |
| 322 214 A1 | 6/1989 | European Pat. Off. . |
| 464 012 A1 | 1/1992 | European Pat. Off. . |
| 28 01 675 | 7/1979 | Germany . |
| 30 05684 | 8/1981 | Germany . |
| 2442 146 | 9/1982 | Germany . |
| 35 10072 | 9/1986 | Germany . |
| 57-199561 | 12/1982 | Japan ...................... 148/528 |
| 80/5766 | 9/1980 | South Africa . |
| 825992 | 4/1981 | U.S.S.R. . |
| 899916 | 1/1982 | U.S.S.R. . |
| 1102936 A | 3/1983 | U.S.S.R. . |
| 1344888 A1 | 1/1986 | U.S.S.R. . |
| 2 004 315 | 3/1979 | United Kingdom . |
| 2138864 | 10/1984 | United Kingdom . |
| 2 146 058 | 4/1985 | United Kingdom . |
| 2 211 875 | 7/1989 | United Kingdom . |

OTHER PUBLICATIONS

Kalpakjian, S., *Manufacturing Processes for Engineering Materials*, Addison–Wesley Publishing, 1991, pp. 783–785.
Rudnev, V., et al., "Magnetic Flux Concentrators: Myths, Realities, + Profits", *Metal Heat Treating*, Mar/Apr. 1995.
Rudnev, V., et al., "Keeping your Temper with Flux Concentrators", *Man–Madern Applications News*, Nov. 1995.
"Production + Concentration of Magnetic Flux for Magnetic Circuit Optimization by Using Flux Concentrators", Fluxtrol Manufacturing, Presented at South America Induction Conference, Sao Paulo, Brazil, Mar. 1995.
*Brazing Handbook*, American Welding Society, 1991, p. 441.
*Asm Handbook*, vol. 6, "Fundamentals of Brazing", pp. 114–125, 1995.
*Asm Handbook*, vol. 6, p. 1207, 1995.
Schwartz, M., *Brazing*, Asm International, 1987, pp. 1–2.

*Primary Examiner*—George Wyszomierski
*Attorney, Agent, or Firm*—Burns, Doane, Swecker & Mathis, L.L.P.

[57] ABSTRACT

A wear resistant, diamond enhanced cutting tool for excavating is disclosed. The cutting tool includes a cutting insert having a diamond coated cutting tip brazed to the cutting insert. The cutting tool is formed by brazing the insert to a tool body with a braze alloy by heating the insert and tool body to a temperature at which the braze alloy melts. The insert and tool body are then cooled to solidify the braze alloy and quenched to cause a martensitic transformation. Finally, the diamond enhanced tip is brazed to the insert while the temperature of the tool body is maintained below a temperature at which the tool body would soften. According to this method, the cutting tool is formed without creating a tempered zone of reduced hardness.

6 Claims, 2 Drawing Sheets

U.S. PATENT DOCUMENTS

| | | |
|---|---|---|
| 3,627,381 | 12/1971 | Krekeier . |
| 3,627,387 | 12/1971 | Page et al. . |
| 3,757,878 | 9/1973 | Wilder et al. . |
| 3,757,879 | 9/1973 | Wilder er al. . |
| 4,109,737 | 8/1978 | Bovenkerk . |
| 4,148,368 | 4/1979 | Evans . |
| 4,274,840 | 6/1981 | Housman . |
| 4,478,298 | 10/1984 | Hake et al. . |
| 4,497,520 | 2/1985 | Ojanen . |
| 4,531,595 | 7/1985 | Housman . |
| 4,592,433 | 6/1986 | Dennis . |
| 4,593,776 | 6/1986 | Salesky et al. ............................ 175/375 |
| 4,604,106 | 8/1986 | Hall et al. . |
| 4,682,987 | 7/1987 | Brady et al. . |
| 4,694,918 | 9/1987 | Hall . |
| 4,702,525 | 10/1987 | Sollami et al. . |
| 4,707,384 | 11/1987 | Schachner et al. . |
| 4,718,505 | 1/1988 | Fuller . |
| 4,731,296 | 3/1988 | Kikuchi et al. . |
| 4,743,515 | 5/1988 | Fischer et al. . |
| 4,751,972 | 6/1988 | Jones et al. . |
| 4,764,434 | 8/1988 | Aronsson et al. . |
| 4,766,040 | 8/1988 | Hillert et al. . |
| 4,784,023 | 11/1988 | Dennis . |
| 4,811,801 | 3/1989 | Salesky et al. . |
| 4,819,516 | 4/1989 | Dennis . |
| 4,820,482 | 4/1989 | Fischer et al. . |
| 4,843,039 | 6/1989 | Akesson et al. . |
| 4,858,707 | 8/1989 | Jones et al. . |
| 4,871,377 | 10/1989 | Frushour . |
| 4,889,017 | 12/1989 | Fuller et al. . |
| 4,938,538 | 7/1990 | Larsson et al. . |
| 4,944,559 | 7/1990 | Sionnet et al. . |
| 4,972,637 | 11/1990 | Dyer . |
| 4,972,912 | 11/1990 | Keshavan ............................... 175/435 |
| 5,007,207 | 4/1991 | Phaal . |
| 5,074,623 | 12/1991 | Hedlund et al. . |
| 5,133,812 | 7/1992 | Kelly et al. ............................. 148/528 |
| 5,161,627 | 11/1992 | Burkett . |
| 5,161,859 | 11/1992 | Larsson et al. . |
| 5,217,081 | 6/1993 | Waldenström et al. . |

DIAMOND COATED CUTTING TOOL INSERT AND METHOD OF MAKING SAME

This application is a continuation-in-part of application Ser. No. 08/145,223 filed Nov. 3, 1993, which is related to application Ser. No. 07/708,058, filed May 30, 1991 (now U.S. Pat. No. 5,161,859), a continuation of application Ser. No. 07/517,023, filed May 1, 1990 (now abandoned), which is a continuation of application Ser. No. 06/586,818, filed Mar. 6, 1984 (now U.S. Pat. No. 4,938,538).

BACKGROUND OF THE INVENTION

1. Field of the Invention

The present invention relates to a tool and a method of making a tool for breaking or excavating material, such as asphalt or coal, comprising a tool body and a cutting insert secured thereto.

2. Background of the Related Art

Tools of the type in question are usually mounted rotatably in a tool holder, which in turn is attached to an excavating machine, such as a road planing machine or a mining machine. Due to its rotation the tool is self-sharpening. A machine of this type is disclosed in U.S. Pat. No. 4,302,055, the disclosure of which is hereby incorporated by reference.

Various styles of rotatable cutting tools with a diamond enhanced inserts are known for use in mining and construction operations. These tools are known as "Point Attack Tools" or "Conical Tools." When this kind of cutting tool is being used, a common problem is the wear of the material around the diamond enhanced insert. As this wear progresses, eventually the insert will lose its support and come loose from the tool body to which it is attached. This problem is called "steel wash" around the insert.

For breaking or excavating of hard wear resistant materials, for instance for milling in poured asphalt (mastic), tools are used of the type shown in FIG. 1. This tool comprises a tool body 10A of steel and a cutting insert 11A of hard metal. The cutting insert 11A is provided with a conical tip portion 12A and a shoulder 13A which is intended to rest against a supporting surface 14A on the tool body 10A. A wide based cutting insert of this type is known as a "cap." The rear contact surface 20A of the shoulder 13A is brazed to the supporting surface 14A. The cutting insert 11A is provided with a conical intermediate portion 15A which is located between the tip portion 12A and the shoulder 13A. The portion 15A protects the portion of the tool body 10A surrounding the cutting insert 11A from such wear that would cause the cutting insert 11A to get loose. When wear resistant material is excavated, for instance during milling in poured asphalt, the tip portion 12A becomes blunt-ended upon some wear of the cutting insert 11A. This wear increases the required cutting force.

One way of decreasing the cutting force required for worn tools would be to use a tool of the type shown in FIG. 2. Since the cutting insert 11B has a smaller diameter than the cutting insert 11A the cutting force is reduced. However, this should mean that the portion 16B of the tool body 10B surrounding the cutting insert 11B would be rapidly abraded, thereby causing the cutting insert 11B to loosen. Thus, cutting inserts of the type shown in FIG. 2 are suitable for use solely where the hard metal determines the life of the tool, for instance milling in concrete.

Another way of protecting the steel is to place a ring of carbide around a carbide insert shaped like a bullet such as the insert 11B. This combination basically functions the same as the "cap." A problem with both the "cap" and the combination of the insert and the ring is that the very top of the insert wears down. When this happens the whole top geometry becomes "blunt" and the cutting forces and the dust generation increase.

In order to overcome this problem, it has been suggested to keep the tip of the tool sharp by enhancing the carbide material of the tip with a layer of diamond material. A diamond coating layer provides improved cutting efficiency, reduced dust generation, less risk for frictional ignitions, etc. However, a common problem specifically related to these diamond coated tools is the fact that the diamond structure cannot withstand temperatures higher than about 650° C. which might be present during the process of brazing the cutting insert to the tool body. This problem can be solved by use of a "heat sink" during the brazing process to keep the area containing diamonds at a lower temperature.

A second problem with diamond coated cutting inserts is that if the diamond enhanced insert is top brazed to a hardened steel body, the steel will get a tempered zone with lower hardness just below the insert. In this tempered zone with lower hardness the wear rate will be higher and the risk of losing the insert is increased.

The cutting insert is formed with a generally conical tip portion and provided with a shoulder which is intended to rest against a supporting surface on the tool body. The cutting insert according to the present invention provides a wear-resistant tool of the above type which requires a low cutting force at the same time as it is ensured that the risk is low that the cutting insert will get loose even during working in wear resistant material.

The invention is described in detail in the following with reference to the accompanying drawings, in which three embodiments are shown by way of example. It is to be understood that these embodiments are only illustrative of the invention and that various modifications thereof may be made within the scope of the claims.

SUMMARY

The invention involves a wear resistant rotatable excavating tool for breaking hard material which addresses the problems associated with the prior art cutting tools. In particular the cutting tool according to the present invention has improved strength because it is made in a manner which avoids the creation of a tempered zone of lower hardness in the tool body. In addition, the cutting tool according to the present invention is more economical to make due to a reduced amount of diamond coating material which is used.

According to one aspect of the invention a method of forming a cutting tool is disclosed which comprises brazing an insert to a tool body with a braze alloy by heating the insert and tool body to a temperature at which the braze alloy melts, cooling the insert and tool body, quenching the insert and tool body, and brazing a diamond enhanced tip to the insert while maintaining a temperature of the tool body below a temperature at which softening of the tool body would take place.

According to another aspect of the invention, a wear resistant cutting tool is disclosed which is formed by brazing an insert to a tool body with a braze alloy by heating to a temperature at which the braze alloy melts, cooling the insert and tool body, quenching the insert and tool body, and brazing a diamond enhanced tip to the insert while maintaining a temperature of the tool body below a temperature at which softening of the tool body would take place.

BRIEF DESCRIPTION OF THE DRAWINGS

The invention will be described in greater detail with reference to the accompanying drawings in which like elements bear like reference numerals, and wherein.

DETAILED DESCRIPTION OF THE PREFERRED EMBODIMENTS

According to the invention, a low energy point attack tool is provided which includes a cutting insert 11 in the form of a "cap" wherein the insert is provided with an insert tip 12 having a wear resistant coating of a material harder than the insert. The method of fixing the wear resistant coated insert tip 12 to the insert 11 will be discussed further below. The wear resistant coating is formed of a material which is harder than the material of the cutting insert 11 and the cutting insert tip 12. For instance, the insert 11 and insert tip 12 can be a cemented carbide and the coating on the insert tip can be diamond and/or cubic boron nitride. The coating can be applied on the exposed surface of the insert tip 12 with or without one or more intermediate non-diamond layers such as Ti, TiC, TiN, etc. therebetween. The coating can be applied by PVD, CVD, high temperature/high pressure (HT/HP) or other conventional technique. The wear resistant coating and intermediate layers can each have a thickness of from about 1.0 µm to about 100 µm and the total thickness of the coating can reach 500 µm or more depending on the thickness of each layer and number of layers. For instance, the coating can include several layers of diamond separated by non-diamond layers. U.S. Pat. Nos. 5,154,245 and 4,707,384, the disclosures of which are hereby incorporated by reference, disclose several diamond coating techniques which can be used for applying the coating.

The wear resistant coating of the insert tip 12 allows the geometry of the insert tip to be maintained for a longer time thus reducing the amount of dust created by the tool, reducing the cutting forces, reducing forces acting on the tool, reducing heat created by the cutting action of the tool, and reducing the possibility of sparking which could otherwise occur due to the contact between the cemented carbide tool and the material being excavated.

Figure 1:
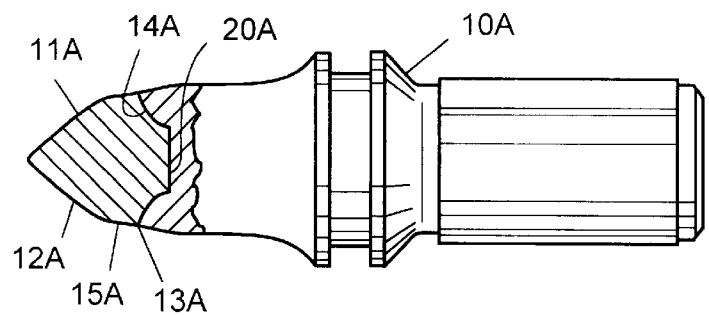
FIG. 1 is a side view, partly in section, of a prior art tool for breaking hard material.
Figure 2:
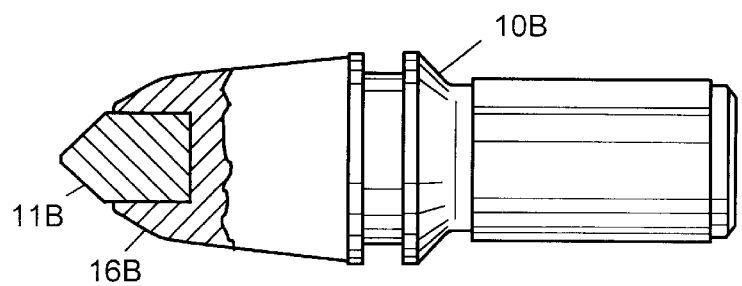
FIG. 2 is a side view, partly in section, of a second prior art tool.
Figure 3:
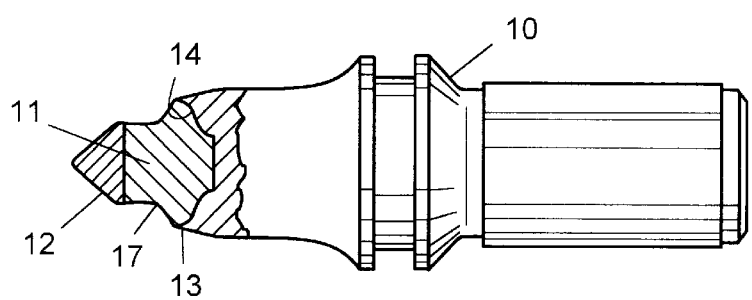
FIG. 3 is a side view, partly in section, of one embodiment of a tool according to the invention.
Figure 4:
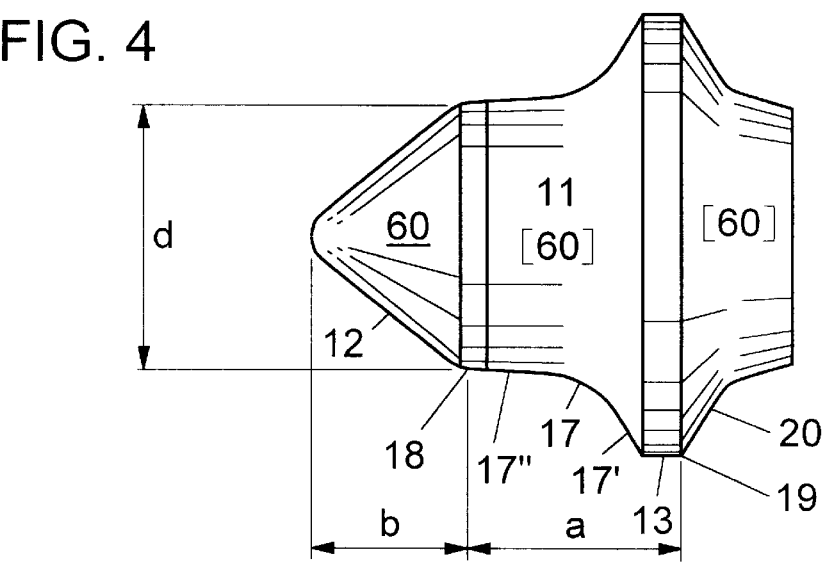
FIG. 4 is an enlarged side view of the cutting insert shown in FIG. 3.

As shown in FIGS. 3 and 4, the cutting insert 11 in a tool according to the invention is provided with an intermediate portion 17 between the insert tip 12 and a shoulder 13. The intermediate portion comprises a concave portion 17'. Due to the intermediate surface portion 17, the required cutting force is maintained low even when the insert tip 12 becomes worn, since the tip size remains generally the same as the tip wears down along the intermediate surface portion 17. Due to this design it is also ensured that the steel in the tool body 10 surrounding the cutting insert is protected against premature abrasion. This protection is provided by the concave portion 17' and the shoulder 13.

The wear resistant coating 60 is preferably applied on the outer surface of the insert tip 12. However, the wear resistant coating 60 can also be applied on the intermediate portion 17 and/or the shoulder 13 in any desirable pattern which completely covers or partially covers the working surface. Preferably, at least the insert tip 12 is completely covered with the coating 60.

As shown in FIG. 4, the portion 17 can comprise a circular-cylindrical portion 17" located adjacent to the insert tip 12. In this embodiment, the distance "a" from the transition 18 between the insert tip 12 and the intermediate portion 17 to the radially outermost portion 19 of the rear contact surface 20 of the shoulder 13 is larger than the distance "b" from the transition 18 to the axially forwardmost portion of the tip portion 12. A rear contact surface 20 of the insert is intended to rest against the supporting surface 14 of the tool body 10.

Further, in the illustrated embodiment, the smallest diameter "d" of the concave portion 17' is smaller than the sum of the above-defined distances "a" and "b". The concave portion 17' is preferably provided with a constant radius of curvature. The enveloping surface of the cylindrical portion 17" extends tangentially to the arc-shaped portion 17'.

In the illustrated embodiment the cutting insert 11 is provided with a rear contact surface 20 projecting rearwardly from the shoulder 13. The end surface of this rear contact surface 20 is shown as planar. It might, however, be recessed, for instance it could be half-spherical or of the general W-shape illustrated in Swedish Pat. Application No. 8400269-0. The bottom of the recess might rest against a correspondingly shaped protrusion on the tool body, or, alternatively, the recess might provide a cavity.

In a further modification, the cutting insert 11 might be made without a rear projection. The rear end surface of the cutting insert, i.e. the end surface of the shoulder, and the cooperating front surface of the tool body might be designed according to any of the above alternatives.

Figure 5:
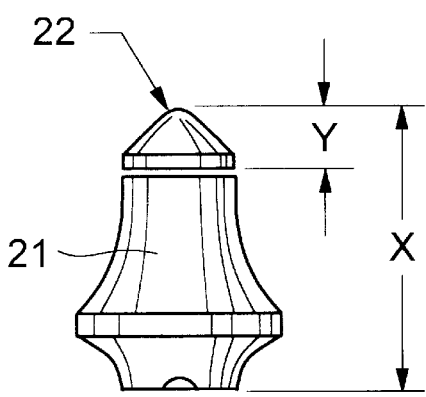
FIG. 5 is an exploded side view of a second embodiment of the cutting insert according to the invention.
Figure 6:
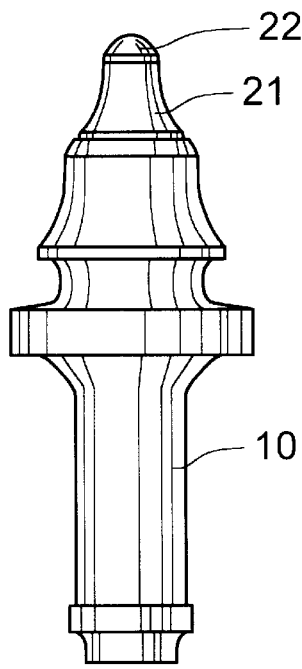
FIG. 6 is a side view of the cutting insert of FIG. 5 mounted in a tool body.

An alternative embodiment of the cutting tool is illustrated in FIGS. 5 and 6. In this embodiment, an insert 21 is shown which is more elongated than the insert 11. In particular, the height Y of the insert tip 22 is less than 0.25 of the total height X of the insert 21 and the insert tip. The insert 21 is shown in FIG. 6 mounted in the tool body 10.

Figure 7:
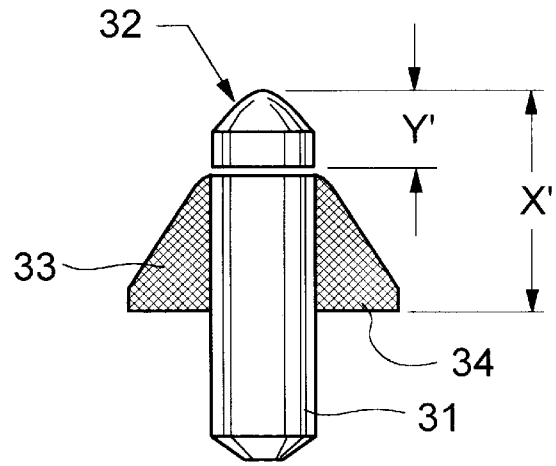
FIG. 7 is an exploded side view of a third embodiment of the cutting insert according to the invention.
Figure 8:
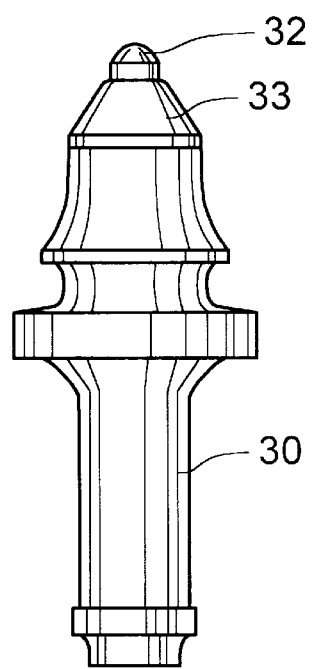
FIG. 8 is a side view of the cutting insert of FIG. 7 mounted in a tool body.

A third embodiment of the cutting tool according to the present invention is shown in FIGS. 7 and 8. The tool according to this embodiment includes a tool body 30, an insert body 31, an insert tip 32, and a ring 33. The ring is preferably formed of a carbide material. As shown in FIG. 7, the height Y' of the insert tip 32 is approximately one third of the total height X' of the ring 33 and the insert tip 32. The carbide ring 33 provides a similar function to the shoulder 13 in the embodiment shown in FIGS. 3 and 4.

In each of the embodiments discussed above, the insert tips are preferably half of the total height of the insert or less. The insert tips each have a conical working surface which is preferably substantially covered with the diamond coating.

The cutting tools according to the present invention are manufactured in a manner which avoids the problems associated with the prior art methods. In particular, the method according to the present invention avoids softening of the tool body and loosening of the insert by preventing the formation of a tempered zone with a low hardness during brazing.

According to the present invention, the cutting tools shown in FIGS. 3–6 are made by the following method. The tool body 10 is machined out of a wear resistant material commonly used for these types of tools, such as steel. The insert body 11 and the insert tip 12 are formed of a material such as carbide, and the insert tip is coated with a wear resistant coating as described above. After initial cleaning and preparation of the tool body 10 and insert parts 11,12, brazing of the cutting tool starts. In the case of the cutting tools shown in FIGS. 3–6, the tool will be manufactured by first brazing the support surface 20 of the insert 11 (the carbide base) to the tool body 10. The tool body 10 and the base of the insert 11 will be fully heated to a temperature where the braze alloy will melt. The temperature at which the braze alloy will melt may be determined according to a recommended braze temperature for the alloy in use. When the braze alloy is fully melted, the heating cycle stops and the cooling cycle begins.

The temperature of the tool body 10 and insert 11 assembly will be allowed to drop to a point so that solidification of the braze alloy will take place. Cooling may be accelerated by blowing forced air on the insert so that the braze alloy will solidify faster. However, cooling can also be accomplished in other known manners.

When the insert has solidified the whole tool will be quenched so that a martensitic transformation will take place. During quenching the tool body 10 and insert 11 will reach a uniform hardness throughout. The assembly will then be tempered according to known tempering procedures.

As a next step, the small diamond enhanced insert tip 12 will be brazed to the carbide insert 11. The brazing of the insert tip 12 will be done in such a way that the temperature in the tool body 10 will stay below the limit where a softening of the steel will take place. Only the carbide insert 11 and the insert tip 12 will be affected by the high braze temperature.

According to this procedure the completely manufactured tool will have a uniform hardness throughout the tool body 10, which improves the wear resistance of the tool. The tool will also have a diamond enhanced tip for improved cutting performance.

The cutting tool shown in FIGS. 7 and 8 will be manufactured according to a procedure which is similar to the procedure discussed above. As a first step a base 34 of the carbide ring 33 will be brazed to a surface of the steel tool body 30. Alternatively, both the carbide ring 33 and the insert body 31 will be brazed to the tool body 30 at the same time. Which of the two alternatives is used is dependent on the braze alloy used for the braze process but will not change the principle for the present invention. The tool body 30 and insert 31 assembly will then be quenched as described above and the small diamond coated insert tip 32 will be brazed onto the insert body 31 as described earlier.

Another important advantage of the process described and according to the present invention is that it can be done very cost effective through the use of only a small diamond enhanced insert tip instead of a big diamond enhanced insert. According to the present invention, the expensive diamond material can be placed in a manner in which it will be utilized in an optimal way.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A method of forming a cutting tool comprising:

brazing an insert to a tool body with a braze alloy by heating the insert and tool body to a temperature at which the braze alloy melts;

cooling the insert and tool body such that the braze alloy solidifies;

quenching the insert and tool body such that a martensitic transformation takes place;

tempering the insert and tool body; and brazing a diamond enhanced tip to the insert at a brazing temperature while maintaining a temperature of the tool body at a lower temperature, said lower temperature being below a temperature at which softening of the tool body would take place.

2. The method of forming a cutting tool according to claim 1, wherein the quenching step results in an insert and tool body having a uniform hardness.

3. The method of forming a cutting tool according to claim 1, wherein the step of brazing the insert to the tool body includes brazing the insert and a surrounding ring to the tool body.

4. The method of forming a cutting tool according to claim 3, comprising brazing a carbide insert and a carbide ring to a tool body formed of steel.

5. The method of forming a cutting tool according to claim 1, comprising brazing a carbide insert to a tool body formed of steel.

6. The method of forming a cutting tool according to claim 1, wherein the diamond enhanced tip is a carbide tip with a diamond coating.

* * * * *